(12) United States Patent
Kollmann

(10) Patent No.: US 7,591,095 B2
(45) Date of Patent: Sep. 22, 2009

(54) WARNING PLATE ASSEMBLY FOR INDICATING THE EXCESS WIDTH OF A TRACTOR, IN PARTICULAR AND AGRICULTURAL TRACTOR

(75) Inventor: Anton Kollmann, Biessenhofen (DE)

(73) Assignee: AGCO GmbH & Co. (DE)

( * ) Notice: Subject to any disclaimer, the term of this patent is extended or adjusted under 35 U.S.C. 154(b) by 407 days.

(21) Appl. No.: 11/093,405

(22) Filed: Mar. 30, 2005

(65) Prior Publication Data

US 2005/0217156 A1 Oct. 6, 2005
US 2006/0130379 A9 Jun. 22, 2006

(30) Foreign Application Priority Data

Apr. 1, 2004 (DE) .................. 20 2004 005 140 U

(51) Int. Cl.
| G09F 21/04 | (2006.01) |
|---|---|
| G09F 15/00 | (2006.01) |
| G09F 15/02 | (2006.01) |
| A45D 19/04 | (2006.01) |
| F16L 3/08 | (2006.01) |
| B60J 9/00 | (2006.01) |
| B62C 1/00 | (2006.01) |
| B62D 23/00 | (2006.01) |
| B62D 39/00 | (2006.01) |

(52) U.S. Cl. .............. 40/590; 40/584; 40/591; 40/606.15; 40/606.18; 40/607.04; 40/607.09; 40/610; 40/588; 248/393; 248/70; 296/1.04; 293/117

(58) Field of Classification Search ............ 40/590, 40/584, 591, 606.15, 606.18, 607.04, 607.09, 40/610, 588; 116/28 R, 52; 248/393, 70; 296/1.04; 293/117
See application file for complete search history.

(56) References Cited

U.S. PATENT DOCUMENTS

| 3,153,398 | A | * | 10/1964 | Runkle et al. ............. 116/28 R |
|---|---|---|---|---|
| 3,788,268 | A | * | 1/1974 | Hiatt et al. ............... 116/28 R |
| 4,094,083 | A | * | 6/1978 | Fund ........................... 40/536 |
| 4,559,518 | A | * | 12/1985 | Latta, Jr. ..................... 340/433 |
| 5,014,954 | A | * | 5/1991 | Merl ....................... 248/285.1 |
| 5,038,136 | A | * | 8/1991 | Watson ...................... 340/480 |
| 5,355,117 | A | * | 10/1994 | Jefferson ................ 340/425.5 |
| 5,475,386 | A | * | 12/1995 | Luoma ...................... 340/908 |
| 5,781,120 | A | * | 7/1998 | Kucik ..................... 340/425.5 |
| 5,847,642 | A | * | 12/1998 | Esposito et al. ............. 340/433 |
| 5,860,385 | A | * | 1/1999 | Lamparter ............... 116/28 R |
| 6,037,866 | A | * | 3/2000 | Leibowitz ................. 340/473 |
| 6,463,687 | B1 | * | 10/2002 | Dorstewitz .................. 40/610 |
| 2003/0172568 | A1 | * | 9/2003 | Uccello et al. ............... 40/603 |

* cited by examiner

Primary Examiner—Paul N Dickson
Assistant Examiner—Syed A Islam

(57) ABSTRACT

A warning plate assembly for indicating the excess width of a tractor, in particular an agricultural tractor. The assembly comprises a holder having a fixing part (1) attached to the vehicle and a deployable arm (3) carrying the warning plate (9). The deployable arm (3) is swivellable about a vertical swivel axis (2*a*) of the fixing part between a lockable deployed position, in which the deployable arm and the warning plate are disposed transversely to the longitudinal direction of the vehicle, and a lockable retracted position in which the deployable arm is disposed substantially in the longitudinal direction of the vehicle. The length of the deployable arm (3) is adjustable (6,7) to cater for different widths of vehicle. The warning plate may be in two halves (10,11) hinged about a vertical axis so that the halves can be folded one over the over for storage.

5 Claims, 2 Drawing Sheets

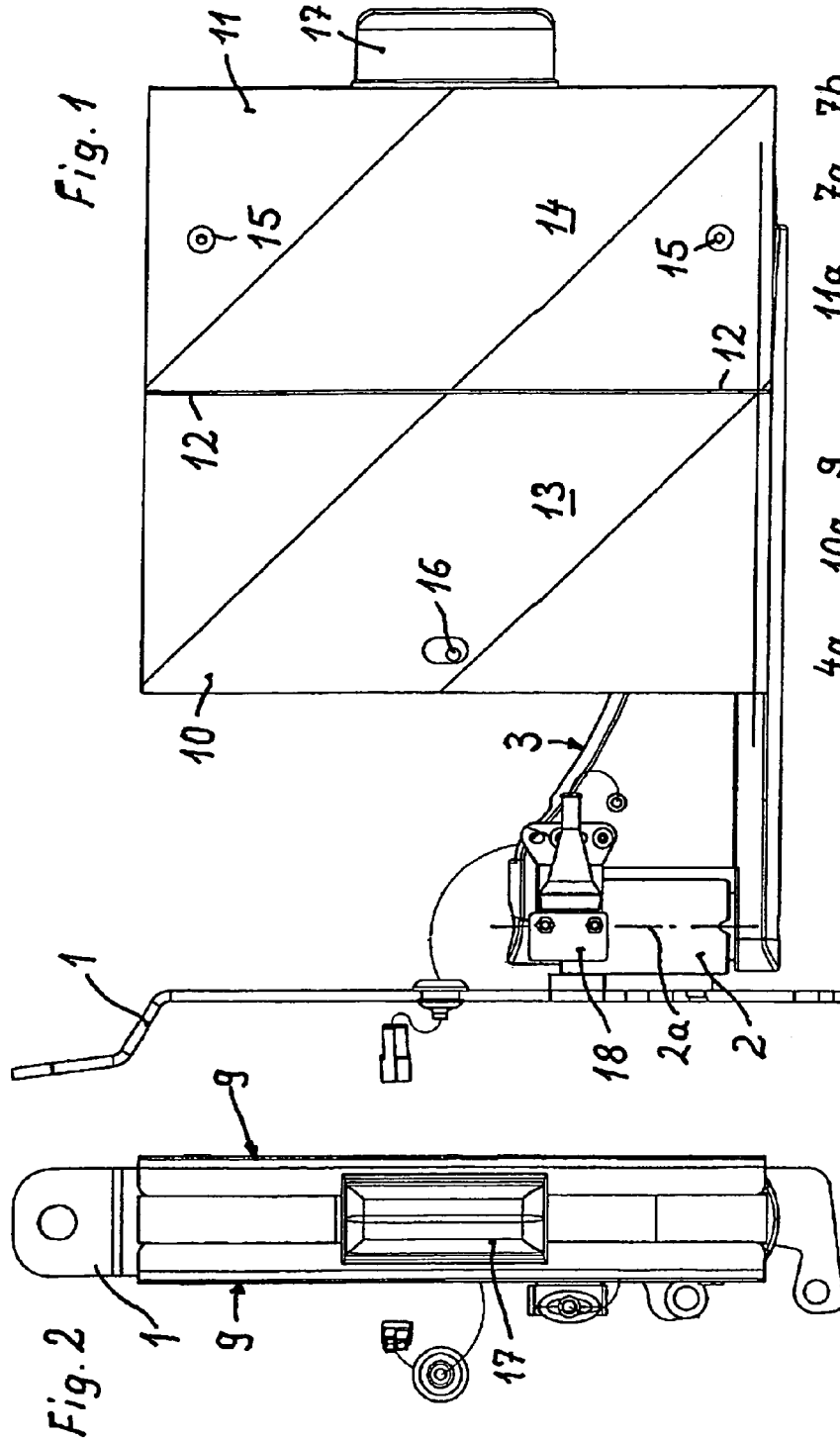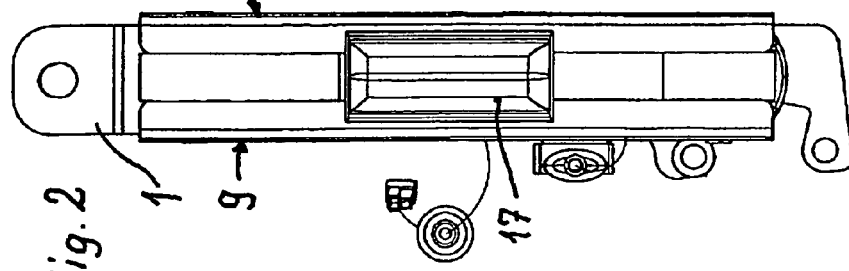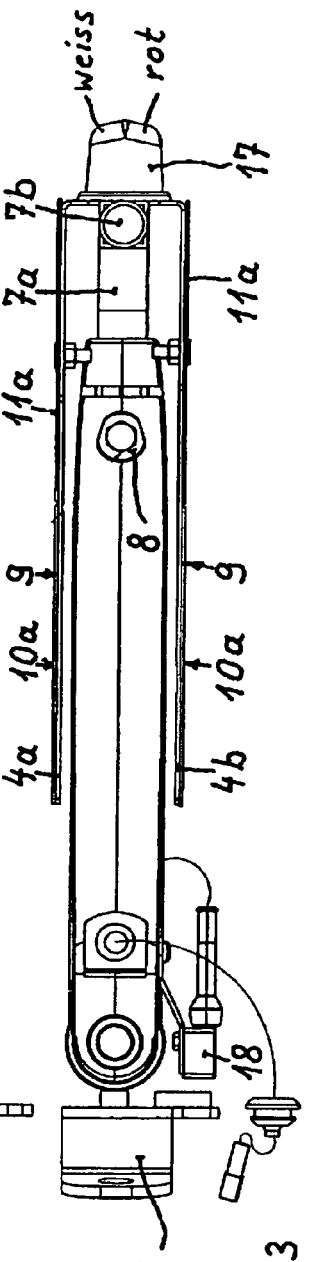

WARNING PLATE ASSEMBLY FOR INDICATING THE EXCESS WIDTH OF A TRACTOR, IN PARTICULAR AND AGRICULTURAL TRACTOR

The invention relates to a warning plate assembly for indicating the excess width of a tractor, in particular an agricultural tractor, the assembly comprises a holder having a fixing part attached to the vehicle and a deployable arm carrying the warning plate, the deployable arm being swivellable about a vertical swivel axis of the fixing part between a lockable deployed position in which the deployable arm is disposed transversely to the longitudinal direction of the vehicle, and a lockable retracted position in which the deployable arm is disposed substantially in the longitudinal direction of the vehicle.

According to § 1 of the 35th Provisional Regulation of the StVZO (German Road Traffic Licensing Regulations) the overall width of . . . tractors . . . may exceed 2.50 m if the greater width results solely from the optional fitting to this vehicle of wide tyres (described in more detail) or with dual tyres (twin tyres). The overall width may not exceed 3.00 m. The increased width must be indicated as follows:

1. . . .
2. For a width of greater than 2.75 m, indication thereof towards the front and rear on both sides by means of parking/warning plates according to §51c of the StVZO is required. The parking/warning plates must end with the lateral contour of the vehicle. Inward deviations of up to 100 mm are admissible.

A holder and associated warning plate meeting these requirements is described in German Utility Model 90 07 069. In this case the deployable arm is in the form of a U-shaped stirrup, the horizontally disposed side-pieces accommodating between them two warning plates, one of which ensures that the excess width of the vehicle is indicated towards the rear and the other that the excess width is indicated towards the front. The length of the side-pieces is such that the outer end of the warning plate when moved to the deployed position is flush with the contour of the vehicle formed by the outside edge of the tyre. A special set of warning plates must therefore be produced and kept for all tyre combinations used on a vehicle that yield different overall vehicle widths. The stirrups on both sides of the vehicle must therefore also be exchanged when the overall width of the vehicle is changed. Apart from the fact that not inconsiderable additional work is associated therewith, there is also, with the known warning plates, the possibility for persons wishing to avoid the additional work of exchanging the plates that the vehicle will be operated in a manner that does not respect the relevant regulations.

If a vehicle previously operated with excess width is then to be operated with normal with, the stirrup carrying the warning plate can be folded to the retracted position, whereby the warning plate comes to be located against the vehicle parallel to the fixing face of the holder. Because the holder is generally fixed to the B-pillar of the driver's cab of the vehicle, this results in a considerable restriction of lateral vision to the outside which impairs traffic safety. In addition, according to the StVZO the reflective visible faces of the warning plate must not radiate light laterally, which is the case, however, with the known warning plate in the retracted state of the stirrup. In order to retain permission for the vehicle to operate, the known warning plate must be covered in the retracted state. As an additional part, however, such a cover requires special cost and attention with regard to manufacture and storage.

It is the object of the invention to improve a warning plate assembly of the above-mentioned type in order to provide simple and convenient handling when converting the vehicle to excess width and vice versa.

This object is achieved in that the length of the deployable arm is adjustable. The warning plate can thereby be simply adjusted to the current vehicle width when fitting tyres or wheels of excess width, simplifying the observance of legal regulations. The danger of operating the vehicle in an illegal configuration is therefore substantially reduced. Further advantageous refinements of the invention are apparent from the dependent claims.

A technically simple solution for providing a length-adjustable deployable arm is provided in that the deployable arm consists of a base part associated with the vehicle and an adjustable part carrying the warning plate which is steplessly adjustable with respect to the base part.

So that the warning plate does not radiate light laterally when swivelled to the retracted position, and to obtain a secure fixing and support of the warning plate on the adjustable part, it is provided that a vertical fixing face for the warning plate is provided on the adjustable part and that the warning plate consists of two halves that are connected and foldable together, one of which halves is fixed to the fixing face. The halves of the plate may be connected by means of an articulation arrangement that is vertical when the warning plate arranged in accordance with regulations and the halves of the plate may be connected together by means of a hinge.

The half of the plate further from the vehicle centre line may expediently be firmly attached to the fixing face while the half of the plate closer to the vehicle centre line is retained against the fixing face and easily detachable therefrom in the folded-out, deployed position of the warning plate.

Because the reverse side of the warning plate does not have a reflective signalling surface in order not to offer a radiant surface upon retraction of the warning plate, it is necessary for the adjustable part to have two fixing faces, one each for a forwardly-facing and for a rearwardly-facing warning plate.

A further feature of the invention that simplifies handling of the warning plate is that the fixing faces are formed by the side-pieces of a U-shaped stirrup, the cross-piece of which is fixed to the adjustable part and carries a combined side marker lamp/rear lamp which is switchable on and off by means of a switch arranged on the fixing part, which switch is actuated in the deployed position of the deployable arm and is not actuated in the retracted position of the deployable arm.

The invention is elucidated in more detail below with reference to the drawings, in which:

FIG. 1 shows a holder in accordance with the invention with the warning plates attached;

FIG. 2 is a side view of the holder according to FIG. 1, viewed from the right;

FIG. 3 is a view of the holder according to FIG. 1, viewed from above;

Figure 4:
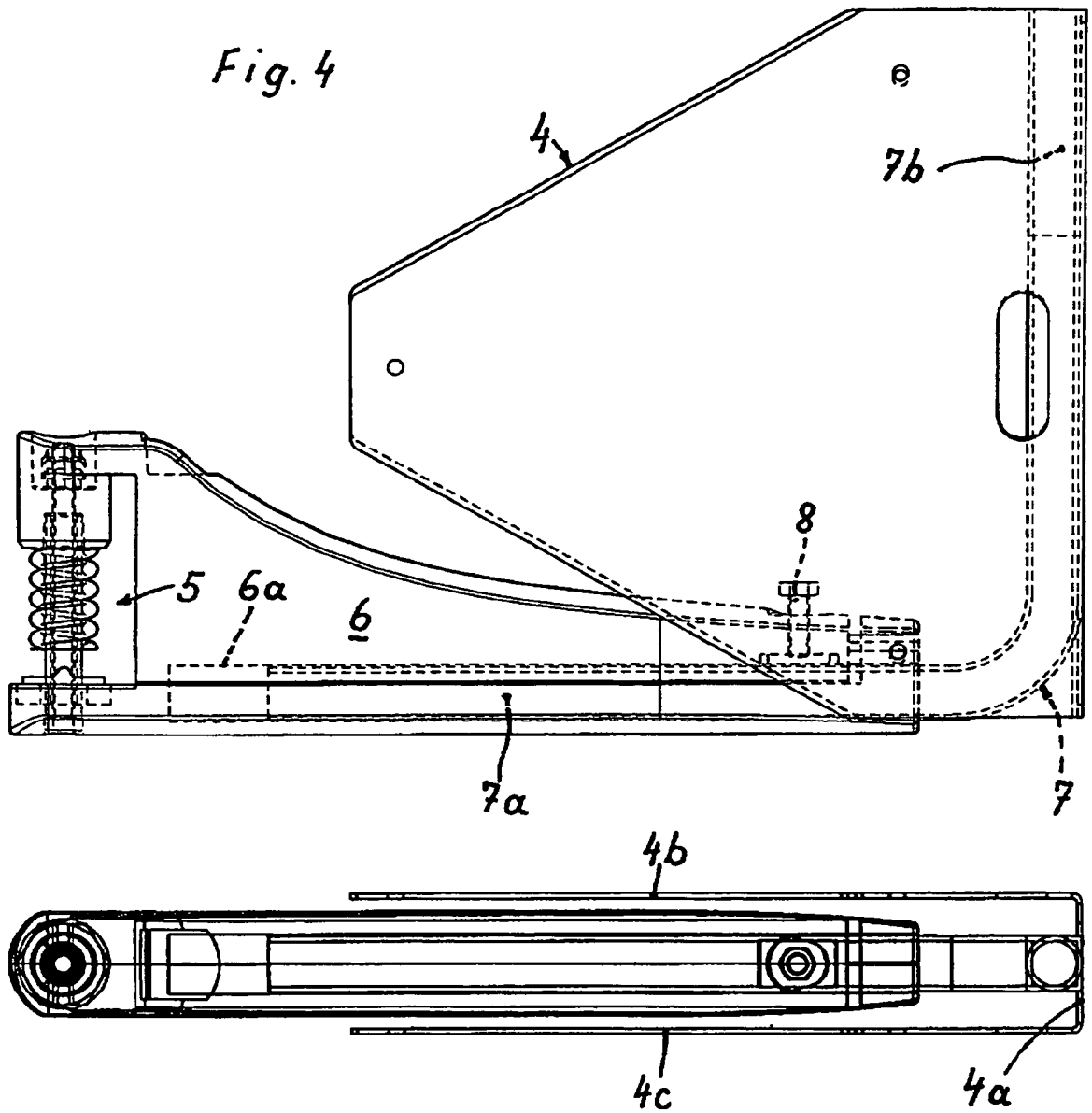
FIG. 4 shows the deployable arm of a holder according to FIG. 1 without warning plates.
Figure 5:
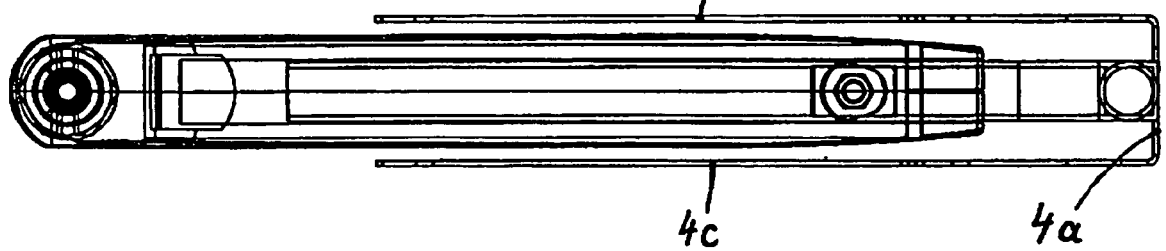
FIG. 5 shows the deployable arm according to FIG. 4, viewed from above.

The holder for warning plates shown in FIGS. 1 to 5 is provided for installation on the driver's cab (not shown) of an agricultural tractor. The holder comprises a fixing part 1 with bearing block 2 screwed to the right-hand B-pillar, viewed in the forward travel direction of the vehicle, a deployable arm 3 swivellably mounted to the bearing block 2 and a warning plate carrier 4.

The end portion of the deployable arm 3, which is in swivelling engagement with the bearing block 2 about a vertical swivel axis 2a, contains a locking device 5 known per se and therefore not described in detail here. Said locking device 5 allows the deployable arm 3 to be swivelled between a deployed position, in which the deployable arm 3 is disposed transversely to the longitudinal direction of the vehicle, as shown in the Figures, and a retracted position, in which the deployable arm 3 is disposed substantially in the longitudinal direction of the vehicle. In both positions the deployable arm 3 is locked, so that it remains in the set position despite forces acting thereon during operation of the vehicle.

The deployable arm 3 comprises a base part 6, which is mounted swivellably to the bearing block 2, and an adjustable part 7. The adjustable part 7 is made from a tube bent at right angles, one leg 7a of which being inserted in a steplessly displaceable manner in a guide 6a of the base part 6 and being lockable in each position by means of a locking screw 8. The other leg 7b is disposed vertically and is used for fixing the warning plate carrier 4. The latter forms a U-shaped stirrup, the cross-piece 4a of which is connected firmly to the vertical leg 7b of the adjustable part 7 and the side-piece faces 4b, 4c of which extending towards the vehicle are provided as carriers for one warning plate 9 in each case.

A warning plate 9 is composed of two halves 10, 11 which are connected and foldable together by means of two hinges 12. Both halves 10, 11, of the plate consist of stable base elements 10a, 10b covered on one side with a reflective signal foil 13, 14 printed with the prescribed warning symbol. Their reverse sides advantageously have a dark surface.

The divided warning plate 9 is fixed to the warning plate carrier in such a manner that after the joint between the halves 10, 111 of the plate has been aligned vertically the half 11 further from the centre line of the vehicle is screwed by means of two screws 15 to the side-piece face 4b or 4c of the warning plate carrier 4. In this case the half 10 of the plate closer to the centre line of the vehicle rests against the side-piece face 4b or 4c in the folded-out warning position of the warning plate 9 and is retained in this position by means of an easily releasable twist fixing 16 known per se. In this position of the halves 10, 111 of the plate the warning plate 9 is fully effective with respect to its warning function.

Upon releasing the twist fixing 16 the half 10 of the plate closer to the centre line of the vehicle can be folded over the half 11 further from the centre line of the vehicle and retained in that position likewise by means of a twist-fixing 16 (not shown). In this position of the halves 10, 111 of the plate the warning plate 9 has no warning function, since its signal foils 13, 14 are located on the now inward-facing sides of the halves 10, 11 and only the dark surface of the base members 10a, 11a is visible from outside.

In addition, a combined side marker lamp/rear lamp 17, supplied with current via a switch 18 mounted on the bearing block 2, is mounted on the cross-piece 4a. The switch 18 can be actuated by the deployable arm 3 when in the retracted position, its contacts being opened, the circuit of the combined side marker lamp/rear lamp 17 being interrupted and said lamp going out. Switching-off of the side marker lamp/rear lamp 17 in the retracted position of the deployable arm 3 is necessary since the lamp part emitting white light and facing forwards in the deployed position of the deployable arm 3 shines to the side in the retracted position of the deployable arm 3, which is not admissible in view of relevant regulations of the StVZO.

Correspondingly, the combined side marker lamp/rear lamp 17 is switched on again as soon as the deployable arm 3 is swivelled out of its retracted position.

The invention claimed is:

1. A warning plate assembly for indicating the excess width of a tractor, in particular an agricultural tractor, the assembly comprising a holder comprising a fixing part for attachment to the vehicle and a deployable arm carrying the warning plate, the deployable arm being swivellable about a vertical swivel axis of the fixing part between a lockable deployed position, in which the deployable arm and the warning plate are disposed transversely to the longitudinal direction of the vehicle, and a lockable retracted position in which the deployable arm is disposed substantially in the longitudinal direction of the vehicle, and the length of the deployable arm (3) is adjustable, and in which a vertical fixing face for the warning plate is provided on an adjustable part (7), and in that the warning plate consists of two halves connected and foldable together, one half being attached to the fixing face; wherein the halves (10, 11) of the plate are connected by means of an articulation arrangement that is disposed vertically when the assembly is secured to the vehicle; wherein the halves (10, 11) of the plate are connected together by means of a hinge (12); and wherein the half (1) of the plate further from the centre line of the vehicle is attached firmly to the fixing face, while the half (10) of the plate closer to the centre line of the vehicle rests against the fixing face and is retained thereto in an easily detachable manner in the folded-out, deployed position of the warning plate (9).

2. An assembly according to claim 1, in which the adjustable part (7) has two fixing faces, one each for a forwardly-facing and for a rearwardly-facing warning plate (9).

3. An assembly according to claim 2, in which the fixing faces are formed by the side-piece faces (4b, 4c) of a U-shaped stirrup, the cross-piece (4a) of which is fixed to the adjustable part (7) and carries a combined side marker lamp/rear lamp (17) which is switchable on and off by means of a switch (18) arranged on the fixing part (1), which switch (18) is closed when in the deployed position of the deployable arm (3) and is opened when in the retracted position of the deployable arm (3).

4. An assembly according to claim 1, the deployable arm comprising a locking device and being swivellable about a vertical swivel axis of the fixing pan between a locked deployed position, in which the deployable arm and the warning plate are disposed transversely to the longitudinal direction of the vehicle, and a locked retracted position in which the deployable arm is disposed substantially in the longitudinal direction of the vehicle.

5. An assembly according to claim 1, in which the deployable arm (3) consists of a base part (6) associated with the vehicle and an adjustable part (7) carrying the warning plate (9) and steplessly adjustable with respect to the base part (6).

* * * * *

UNITED STATES PATENT AND TRADEMARK OFFICE
CERTIFICATE OF CORRECTION

| | | |
|---|---|---|
| PATENT NO. | : 7,591,095 B2 | Page 1 of 1 |
| APPLICATION NO. | : 11/093405 | |
| DATED | : September 22, 2009 | |
| INVENTOR(S) | : Anton Kollmann | |

It is certified that error appears in the above-identified patent and that said Letters Patent is hereby corrected as shown below:

On the Title Page item (54), should read:

-- WARNING PLATE ASSEMBLY FOR INDICATING THE EXCESS WIDTH OF A TRACTOR, IN PARTICULAR AN AGRICULTURAL TRACTOR --.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,591,095 B2 | Page 1 of 1 |
| APPLICATION NO. | : 11/093405 | |
| DATED | : September 22, 2009 | |
| INVENTOR(S) | : Anton Kollmann | |

It is certified that error appears in the above-identified patent and that said Letters Patent is hereby corrected as shown below:

On the Title Page item (54) and Column 1, lines 1-4, should read:

-- WARNING PLATE ASSEMBLY FOR INDICATING THE EXCESS WIDTH OF A TRACTOR, IN PARTICULAR AN AGRICULTURAL TRACTOR --.

This certificate supersedes the Certificate of Correction issued November 24, 2009.

Signed and Sealed this

Fifteenth Day of December, 2009

David J. Kappos
*Director of the United States Patent and Trademark Office*